United States Patent

Robbins

[15] 3,688,159

[45] Aug. 29, 1972

[54] COMPRESSION MOUNTED SCR CLAMP WITH HEAT SINK MEANS

[72] Inventor: Clyde F. Robbins, Milwaukee, Wis.

[73] Assignee: Cutler-Hammer, Inc., Milwaukee, Wis.

[22] Filed: Oct. 28, 1970

[21] Appl. No.: 84,556

[52] U.S. Cl.................317/100, 174/DIG. 5, 317/234

[51] Int. Cl...................................................H01l 1/12

[58] Field of Search.............174/DIG. 5, 15 R, 16 R; 317/100, 234 A

[56] References Cited

UNITED STATES PATENTS

| | | | |
|---|---|---|---|
| 3,571,663 | 3/1971 | Hungate | 317/100 |
| 3,536,960 | 10/1970 | Otteson | 317/100 |

OTHER PUBLICATIONS

Model 130 Compression Mounted SCR Clamp and Various Type PP Heat Sinks, Bulletin No. 130A, Wakefield Engineering, Inc. 6/17/69.

*Primary Examiner*—Lewis H. Myers
*Assistant Examiner*—Gerald P. Tolin
*Attorney*—Hugh R. Rather and William A. Autio

[57] ABSTRACT

A mounting clamp including heat sinks for a compression mounted type power semiconductor device such as an SCR, rectifier diode, or the like. Diamond shaped, tapered springs distribute the stresses equally throughout their lengths to afford greater deflection that reduces tolerances and facilitates staying within the allowable pressure range. A unitary spring subassembly also holds the pressure bearing and the load indicator. The construction is such that if the various parts become tilted on the pressure points, the line of force will still be through the center of the silicon disc inside the SCR. A pressure plate provides an enlarged base to afford low unit pressure on the insulation. Insulated parts afford the required electrical clearances. A dust-tight insulating cover or "boot" performs sealing, positioning and insulating functions during use and may also serve as a cushioned packing during shipment.

11 Claims, 13 Drawing Figures

Inventor
Clyde J. Robbins
By Wm. A. Autio
Attorney

Inventor
Clyde J. Robbins
By Wm. A. Austin
Attorney

COMPRESSION MOUNTED SCR CLAMP WITH HEAT SINK MEANS

BACKGROUND OF THE INVENTION

Compression mounted SCR clamps have been known heretofore. While these prior clamps have been useful for their intended purpose, they have had one or more disadvantages such as limited load capacity, stiff springs creating excessive stresses and difficulty of adjustment within allowable pressure ranges, too much friction that can unbalance the forces on the semiconductor device, insufficient electrical clearances, and lack of protection against dust and dirt, and the like.

SUMMARY OF THE INVENTION

This invention relates to a compression mounted semiconductor clamp.

The purpose of such a clamp is to provide adjustable, uniform unit pressure over the entire area of the silicon disc that is contained within the SCR.

An object of the invention is to provide an improved heatsink clamp for a compression mounted power semiconductor device.

A more specific object of the invention is to provide such clamp with improved springs.

Another specific object of the invention is to provide such clamp with an improved spring subassembly.

Another specific object of the invention is to provide such clamp with improved pressure equalizer structure.

Another specific object of the invention is to provide such clamp with an improved dust tight insulating boot.

Another specific object of the invention is to provide such clamp with improved force indicator means facilitating clamping of the simiconductor device therein at the clamping force required.

Another specific object of the invention is to provide such clamp with improved means enabling use thereof for any one of a plurality of clamping forces with a minimum of substitution of parts.

Another specific object of the invention is to afford more travel of the adjusting nuts for a given change of load, thus making it easier to adjust to a desired load and making it less subject to load change due to temperature variations or other mechanical changes with time, this being obtainable with tapered springs.

Other objects and advantages of the invention will hereinafter appear.

DESCRIPTION OF THE PREFERRED EMBODIMENTS

Figure 1:
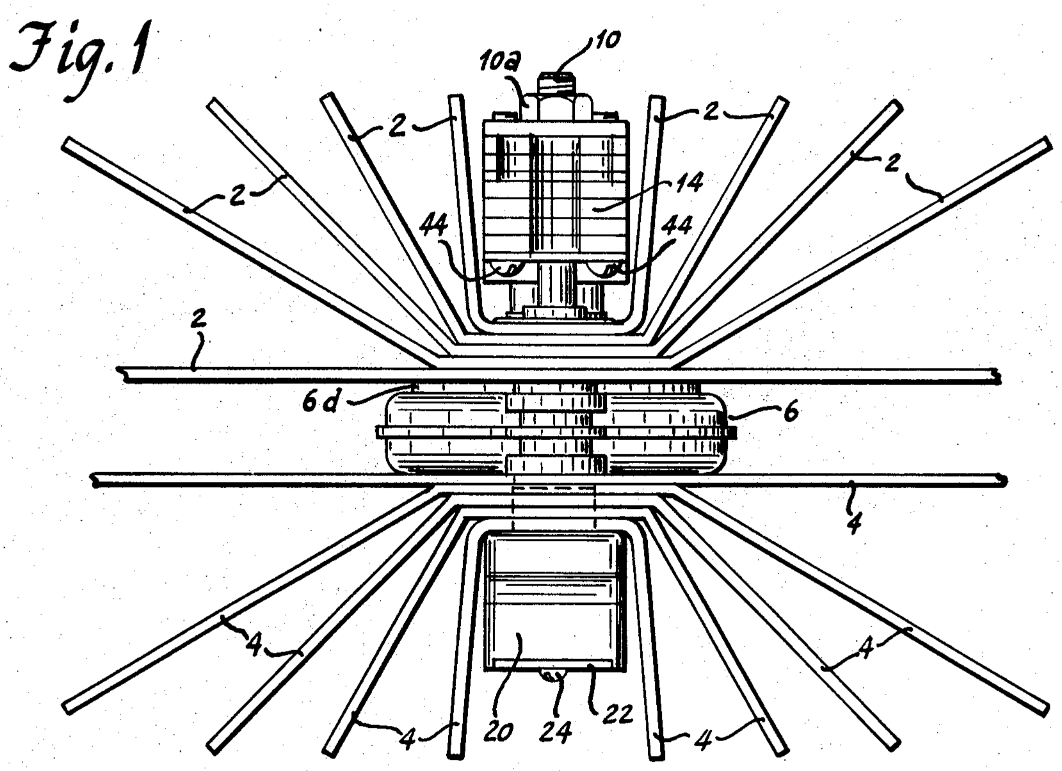
FIG. 1 is an end elevational view of a compression mounted SCR clamp constructed in accordance with the invention.
Figure 2:
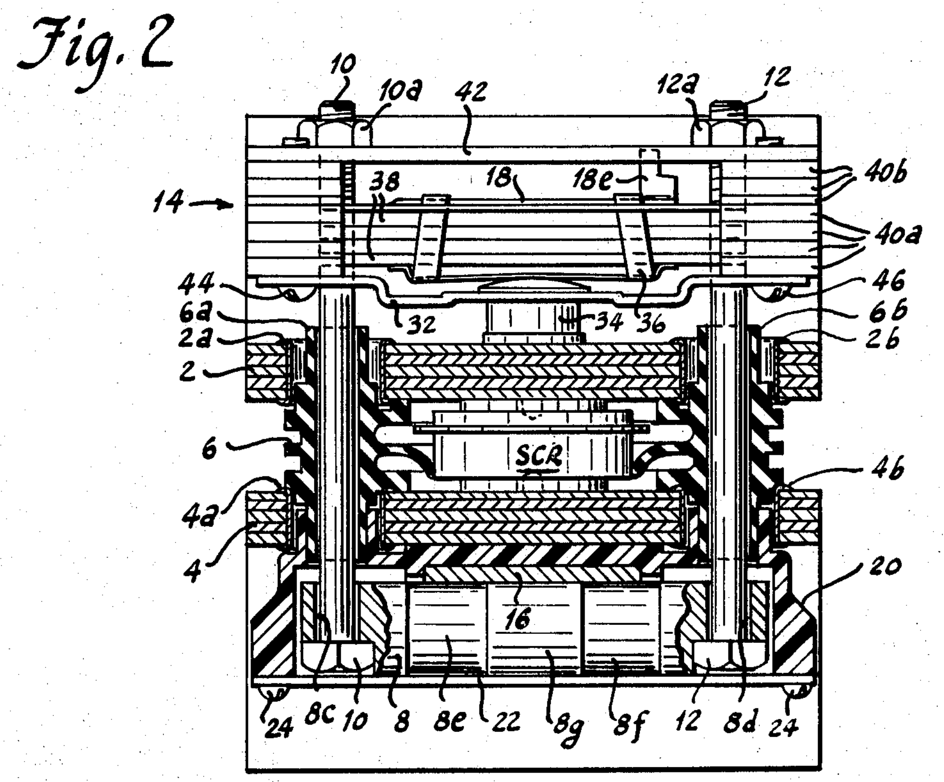
FIG. 2 is a partial sectional view taken vertically through the center portion of FIG. 1.

Referring to FIGS. 1 and 2, there is shown a compression mounted SCR clamp constructed in accordance with the invention. As shown therein, the clamp comprises two heat sinks 2 and 4 located above and below, respectively, of the SCR that is enclosed within a rubber boot 6. Heat sinks 2 and 4 confine the SCR therebetween and afford electrical power connections to the cathode and anode thereof, respectively, and heat conductive paths therefrom, the gate and cathode of the SCR having control leads as hereinafter more fully described.

Figure 6:
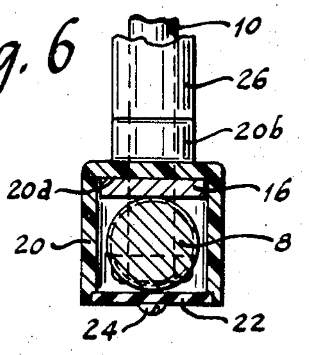
FIG. 6 is a cross-sectional view taken along line 6—6 in FIG. 5.

The SCR clamp also comprises means for clamping the two heat sinks and the SCR therebetween and for applying the required force thereto to afford good electrical connection and heat conduction. This means comprises an insulated pivot bar and bolts assembly and a spring subassembly. Pivot bar or cross bar 8 lies below heat sink 4. Bolts 10 and 12 extend up through the ends of the pivot bar past the opposite sides of the SCR. Spring subassembly 14 overlies heat sink 2. The bolts extend through this spring subassembly and the nuts are turned tight to clamp the heat sinks and the SCR between the pivot bar and the spring subassembly. A pressure plate 16 transfers the compression force from the round pivot bar to the flat section of heat sink 4 as shown in FIGS. 2 and 6. An indicator 18 shows when the specified force is reached as the nuts are tightened.

Figures 4, 5, 8:
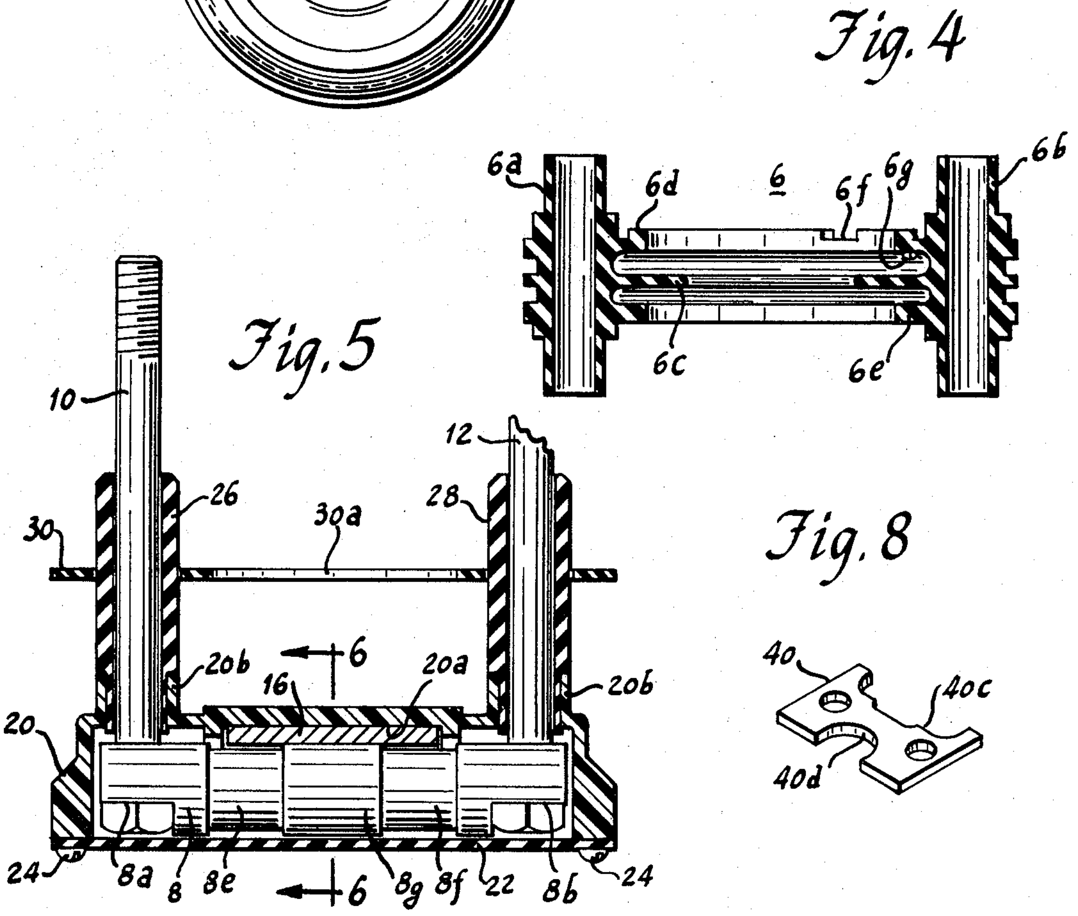
FIG. 4 is a cross-sectional view taken along line 4—4 in FIG. 3.
FIG. 5 is a cross-sectional view of the insulator assembly surrounding the pivot bar and bolts of the clamp of FIG. 1.
FIG. 8 is an isometric view of one of the spring guides used in the clamp of FIG. 1.

As shown in FIGS. 2 and 5, pivot bar 8 comprises an elongated round bar having undercuts **8*a* and 8*b* at its ends and holes 8*c* and 8*d* extending from these undercuts up through the pivot bar. The two bolts are inserted through these holes and the undercuts accommodate the bolt heads and keep them from turning thereby to form a U-shaped clamping structure. This pivot bar is also provided with two reduced diameter sections 8*e* and 8*f* symmetrically spaced to leave a raised center section 8*g* for supporting pressure plate 16** at its center portion, leaving the opposite end portions of the pressure plate overhanging the reduced diameter sections. This construction provides an elongated pivot under the pressure plate affording self-alignment and central loading by the bar and an enlarged base to provide low unit pressure on the insulation.

As shown in FIGS. 2 and 5, the pivot bar, pressure plate and bolts are covered by an insulator assembly. This insulator assembly electrically insulates the anode side of the SCR and heat sink 4 from the other metal parts of the clamp. This is necessary because heat sink 4 is also used as an electrical connector between the anode and an external circuit.

This insulator assembly comprises a first section 20 having the form generally of an inverted trough. A shallow recess 20*a* shown in FIGS. 5 and 6 is formed by a pair of spaced ribs in the interior surface of its upper wall for centering pressure plate 16. A pair of holes are provided near the respectively opposite ends of its upper wall through which bolts 10 and 12 are inserted, these holes being surrounded by short upstanding bushings 20*b* . When the bolts are so inserted all the way, the pressure plate will be confined in its recess between insulator section 20 and the pivot bar, and the pivot bar and the heads of the bolts will be surrounded by the insulating section, the open bottom of this insulator section being closed by a suitable insulating cover 22 that may be secured by a pair of screws 24 as shown in FIG. 2.

This insulator assembly also comprises either insulating boot 6 shown in FIGS. 2 and 4 or a pair of insulating sleeves 26 and 28 and an SCR locating plate 30 shown in FIG. 5. If the dust tight boot is not required, then the two sleeves and locating plate are used. In either case, the bolts will be insulated all the way from insulator section 20 up through heat sink 2.

As shown in FIG. 5, insulating sleeves 26 and 28 each have a reduced diameter lower end portion that telescopes into the associated bushing 20*b* for a tight fit thereby providing long electrical insulation distances between heat sink 4 and the bolts. Locating plate 30 has a pair of holes through which the insulated bolts extend as shown in FIG. 5 and a larger round center hole 30*a* that fits around the SCR to hold it in the center. As will be apparent, this locating plate is made of insulating material and is lowered onto the bolts after the lower heat sink 4 has been put thereon.

Figure 3:
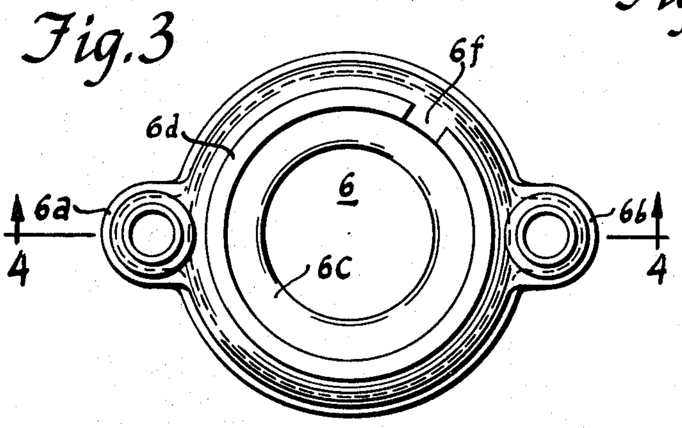
FIG. 3 is a top view of the insulating boot used in the clamp of FIG. 1.

In a similar manner, the lateral tubular portions 6*a* and 6*b* of insulating boot 6 shown in FIGS. 2, 3 and 4 have reduced diameter lower end portions that fit within bushings 20*b* around bolts 10 and 12. Boot 6 is provided at its central portion with a thin portion in the form of an apertured diaphragm 6*c*. The hole in this diaphragm is slightly smaller in diameter than the SCR so that when the SCR is inserted therein as shown in FIG. 2, a dust tight connection will be attained. This boot is also provided with circular portions 6*d* and 6*e* above and below diaphragm 6*c* that bear against heat sinks 2 and 4, respectively, to form dust tight connections therebetween as shown in FIGS. 1, 2 and 4. This boot is further provided with a groove 6*f* in the upper surface of its upper circular portion to provide an outlet for a cathode lead, this lead being a low voltage control correction additional to the high voltage power connection through heat sink 2. A small hole 6*g* is provided above diaphragm 6*c* as an outlet for a gate lead. This groove and small hole are shown in FIG. 4.

Heat sinks 2 and 4 are constructed to provide rapid conduction of heat from the anode and cathode of the SCR and radiation of this heat into the atmosphere. One of the advantages of this clamp mounting is that two good thermal paths are provided from the SCR rather than one thermal path as in stud type mountings. As shown in FIGS. 1 and 2, each heat sink comprises a plurality, such as five, metal plates of rectangular shape. The first plate, that is, the plate contacting the SCR, is planar. Each additional plate in the stack has its opposite end portions bent away from the first plate at equal angles, the bends in successive plates being at progressively larger angles. In this manner, the plates of one heat sink flare out through the first 180° angle and the plates of the other heat sink flare out through the other 180° angle to afford maximum heat radiation into the atmosphere.

The plates of each heat sink are secured together by a pair of grommets 2*a–b*, 4*a–b*, at the holes through which the clamping bolts extend as shown in FIG. 2. These grommets are large enough to receive the insulating sleeves 26 and 28 or tubular portions 6*a–b* of the insulating boot.

Spring subassembly 14 shown at the upper part of FIGS. 1 and 2 controls the ease with which the required force may be applied between the heat sinks and the main terminals of the SCR within the specified force tolerances. This spring subassembly comprises a bottom plate 32 that supports and centers a pressure bearing or pivot 34 through which force is applied to the upper heat sink in a self-aligning manner as hereinafter more fully described.

Figure 7:
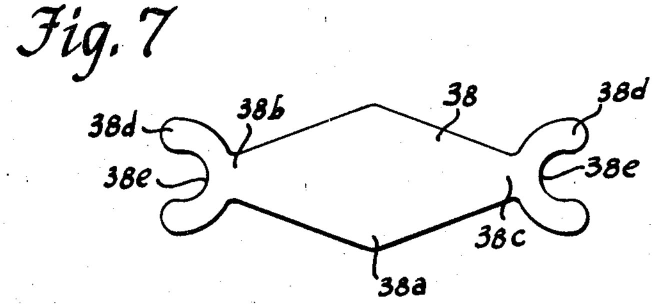
FIG. 7 is a top view of one of the compression force springs used in the clamp of FIG. 1.

This subassembly also comprises a spring clip 36 for holding a plurality of flat springs 38 in stacked relation during assembly, four such springs being shown in FIG. 2. FIG. 7 shows a top view of one of these springs.

This subassembly also is provided with two stacks of spring guides, one at each end of the springs, and each comprising a plurality of spring guides 40 shown in more detail in FIG. 8. In FIG. 2 these spring guides are marked 40*a* when they are used to enclose and guide the ends of the springs whereas those spring guides that are turned 180° to be used to press down on the springs are marked 40*b*.

As shown in FIG. 8, when the right-hand side with its larger slot 40*c* is turned toward the middle of the clamp, the spring guide 40*a* will enclose and guide the end of the spring. This slot 40*c* provides clearance for both the spring end and the bolt. When the left-hand side with its smaller slot 40*d* is turned toward the middle of the clamp, the portions of spring guide 40*b* on opposite sides of slot 40*d* will press down on the ends of the spring. This smaller slot 40*d* provides clearance for the bolt. Thus, there is provided a universal spring guide that can be used for either purpose.

Figure 9:
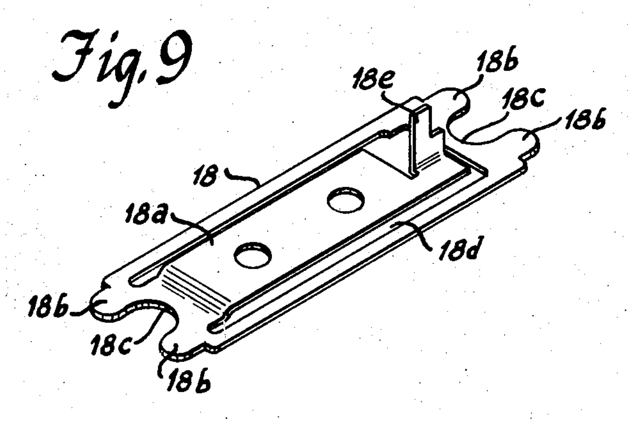
FIG. 9 is an isometric view of the force indicator used in the clamp of FIG. 1.

The spring subassembly also comprises the aforementioned force indicator 18 on top of the stack of springs, this force indicator being more clearly shown in FIG. 9. The ends of this force indicator are also pressed down by spring guides 40*b* in a unitary stack with the springs.

The spring subassembly further comprises a top plate 42 lying across the two stacks of spring guides.

For holding the spring subassembly together, two screws 44 at the left end as seen in FIG. 2 extend up through the bottom plate and the stack of spring guides 40*a* and 40*b* and are threaded in a pair of holes in the top plate. Both of these screws are shown in FIG. 1. In a similar manner, two screws 46 at the right end extend up through the bottom plate and the stack of spring guides 40*a* and 40*b* and are threaded into the top plate, one of these screws being shown in FIG. 2.

Bottom plate 32 comprises a generally rectangular strip of metal having a pair of small holes at each end for the pairs of screws 44 and 46. Next to each pair of small holes is a larger hole for the respective clamping bolts 10 and 12. The central portion between the bolt holes is offset downwardly and a large hole is provided at the center of this offset to receive pressure pivot 34, the offset providing clearance above the bottom plate for the upper end of this pressure pivot and spring clip 36. While this bottom plate has been shown with an offset, it may alternatively be flat if spring clip 36 is not used.

Pressure pivot 34 comprises a generally cylindrical metal member resting at its lower end on heat sink 2. Its upper end is rounded in the form of a partial sphere having a radius that directs the forces through the center of the silicon disc in the SCR and an annular flange directly below this rounded upper end rests on bottom plate 32 whereby it is centered and held in place. The pressure pivot is assembled by dropping its lower end through the large center hole in the bottom plate and allowing it to be stopped by its annular flange.

Spring clip 36 comprises a thin member of stainless steel or the like having a generally flat rectangular horizontal lower portion with the left and right ends offset slightly upwardly to bear against the lower spring 38, causing the central part thereof that bears down against the upper end of the pressure pivot to be spaced slightly from the lowest spring thereby taking up slack in the mechanism. This spring clip is further provided with four upstanding arms for cradling the stack of flat springs 38, one such arm extending up from each corner of the horizontal lower portion to provide two widely spaced apart arms on the front of the springs and two similarly spaced apart arms on the back of the springs. Thus, the spring clip with its upstanding arms provides a trough into which the springs may be dropped and in which they are held in stacked relation during assembly. As shown in FIG. 2, the upper ends of these arms extend through the lateral slits in indicator 18, shown in FIG. 9 and described directly hereafter, and stand clear of the central tongue 18a of the indicator.

Indicator 18 shown in FIGS. 2 and 9 comprises a generally rectangular plate of stainless steel or the like having a pair of rounded projections **18*b* at each end, the projections of each such pair being divided by a rounded slot providing clearance for the respective clamping bolt. By removing a narrow strip of material, a slit 18*d* is cut from a point near the left rear projection 18*b* along the rear edge to point near the right rear projection, then forwardly to a point near the right front projection, and then along the front edge to a point near the left front projection. This cutout forms an elongated rectangular tongue 18*a* secured at its left end and free to move up and down at its right end. This tongue is offset at its left end slightly upwardly to extend in a parallel horizontal plane slightly above the plane of the remainder of the indicator to be free and clear of the upper spring in the stack. The free end of tongue 18a has a tab 18e sheared and bent up and provided with a notch to extend through a hole in top plate 42 and to serve as an indicator in cooperation with the top plate as hereinafter more fully described. The two holes in the indicator shown in FIG. 9** are pilot holes used in manufacturing.

All of the flat springs 38 are alike as shown in FIG. 7. Each spring is generally diamond shaped in that it tapers from its widest part **38*a* at the center toward the opposite ends so that the narrowest points 38*b* and 38*c* are near the opposite ends. Beyond these narrowest points, each end of the spring is provided with a shape generally like the ends of the indicator hereinbefore described; that is, each end has a pair of rounded lateral projections 38*d* separated by a slot 38*e* that provides clearance for the associated clamping bolt. This tapering is at a slope that equalizes the stresses along the length of the spring when the required load is applied thereto. These springs are made of stainless steel or the like and are of equal thickness. Or the lowermost spring may be thinner to reduce the stresses caused by bending under load thereby to avoid excessive total stress therein when the additional stress caused by pressure pivot 34** bearing thereagainst is applied thereto under load. This precaution will prevent the lower spring from breaking.

Top plate 42 comprises a rectangular strip of steel or the like having a pair of tapped holes at each end for pairs of screws 44 and 46. A pair of larger holes are provided for clamping bolts 10 and 12, and these holes are preferably slightly oblong to avoid the necessity of close tolerances. Furthermore, this top plate is provided with a narrow slit or hole through which indicator tab 18e extends.

From the foregoing description of the structure, it will be apparent that the clamp may be assembled by first pushing the two bolts through the holes in the ends of pivot bar 8. Pressure plate 16 is then placed in its recess within insulator section 20 and the clamping bolts are inserted through the bushings of the latter. Cover 22 may then be secured in place by the screws to completely enclose the pivot bar, pressure plate and the bolt heads. The clamping bolts may then be inserted through the grommeted holes in lower heat sink 4.

At this time, either insulating boot 6 or insulating sleeves 26 and 28 and locating plate 30 are selected for use in the clamp. In the first case, the clamping bolts are inserted through the tubular portions of the insulating boot. In the second case, the clamping bolts are inserted through the respective sleeves and the insulated bolts are then inserted through the holes in the locating plate.

SCR and boot are usually assembled first and this assembly put in place. Replacements may be shipped assembled, the boot acting as packaging for the SCR to protect it during shipment. When the SCR is placed in the boot, the gate lead is inserted through the hole in the boot and the cathode lead is placed through the slot in the upper part of the boot.

The upper heat sink 2 is placed on top with the insulated clamping bolts extending through the grommeted holes thereof. Each heat sink may be provided with a short pin that enters a complementary hole in the SCR to insure centering of the latter when boots are not used.

The spring subassembly is separately put together before it is assembled to the clamping bolts. For this purpose, screws 44 and 46 are inserted up through bottom plate 32 and pressure pivot 34 is dropped into the center hole in the latter. Next, an equal number such as four spring guides **40*a* are dropped onto each pair of screws 44 and 46**.

Springs 38 are then stacked onto spring clip 36 and indicator 18 is placed on top of the stack of springs. This assembly is then lowered between the two stacks of spring guides 40*a* onto pressure pivot 34.

After this, the remaining spring guides 40*b* are dropped onto each pair of screws with a spring guide of the same thickness or thinner going first on top of the indicator. Because this first spring guide bears against the stainless steel indicator and applies the load, it is made of stainless steel and may be made thinner in the interest of economy. The other spring guides are made of lower cost cold rolled steel and of as thick a material as can effectively be punched without distortion beyond required tolerances. The spacing between the spring stack and the top plate determines the length of the indicator tab 18*e* and is dependent on whether the lower spring guide 40*b* at each side is made the same thickness or of one-half the thickness of the other spring guides.

Finally, top plate 42 is placed on top and the two pairs of screws are threaded thereinto to complete the spring subassembly.

The clamping bolts are then inserted through the spring subassembly and nuts 10*a* and 12*a* are threaded on the clamping bolts. As the nuts are tightened, the springs bow and indicator 18 bows with them causing tongue 18*a* to lift force indicator tab 18*e* through the hole in the top plate.

In order to apply the required force between the heat sinks and the SCR, such as 800, 1,200, 1,600, or 2,000 lbs., the nuts are tightened until the notch on force indicator tab 18*e* registers with the top plate. The flat springs 38 may be selected in equal steps of 400 lbs. per step or the like so that for an 800 lb. force, two springs are used, for a 1,200 lb. force, three springs are used, etc. The clamp thereby is adapted to suit the loads specified by the various manufacturers of SCR's or other power devices with which the clamp may be used. The stack can be adjusted to accommodate various numbers of springs by changing the number of reversed spring guides. Screw and bolt lengths may need to be changed accordingly.

The modified spring and indicator subassembly shown in FIGS. 10–13 comprises a metal frame 50 having spring retainers 52 and 54 secured thereto at the respective ends thereof. An indicator mechanism 56 is mounted at the center of the metal frame. A plurality of flat springs 58 are stacked in the spring retainers between clamping bolts 10 and 12. A pressure pivot or bearing 60 is positioned below the stack of flat springs and is centered and held in place by a bottom plate 62 secured to the metal frame. The lower end of this pressure bearing rests on and applies force through upper heat sink 2 to the SCR when nuts 10a and 12a of the clamping bolts are turned tight.

Figure 10:
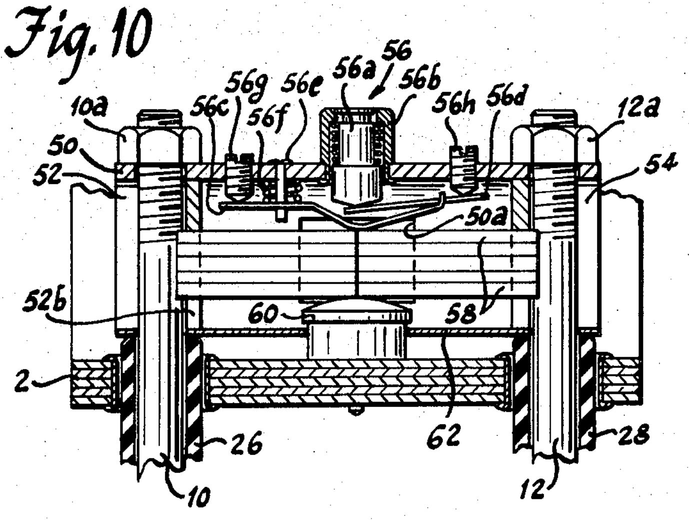
FIG. 10 is a fragmentary cross-sectional view of a modified spring and indicator subassembly.
Figure 11:
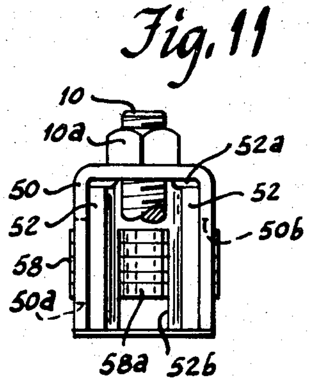
FIG. 11 is a left end view, with the bolt broken away, of the modified subassembly of FIG. 10.
Figure 12:
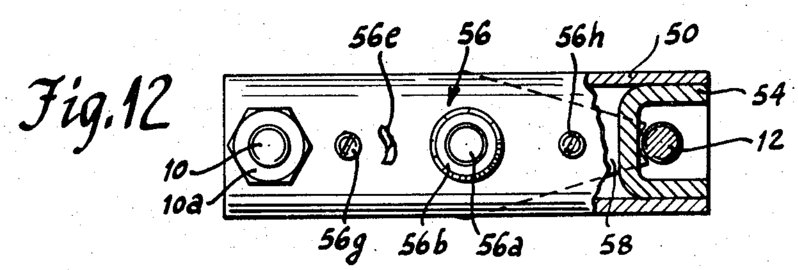
FIG. 12 is a top view of the subassembly of FIGS. 10 and 11 with a portion broken away to show the U-shaped spring retainer.

As shown in FIGS. 10–12, frame 50 is inverted U-shaped in cross-section of the general shape of an upside down trough having a flat upper portion and front and rear depending skirts. The center portions of these skirts are provided with rectangular cutouts 50*a* and 50*b* providing clearance for the wider center portions of the diamond shaped springs. One of these cutouts 50*a* preferably terminates short of the lower edge of the skirt as shown in FIG. 10 to assist in retaining the springs when they are stacked in the frame. The other cutout 50*b* extends all the way through the lower edge of the associated skirt as shown in FIG. 11 to provide clearance for insertion of the springs in the frame.

Frame 50 is also provided with bolt holes at the opposite ends of its flat upper portion through which clamping bolts 10 and 12 extend.

Each spring retainer 52 and 54 comprises a U-shaped metal member shown most clearly in FIG. 12. The legs of member 52 extend toward the left within the frame and are coextensive with the left end of the frame. In a similar manner, the legs of retainer 54 extend toward the right within the frame and are coextensive with the right end of frame 50 as shown in FIG. 12. The legs of each such U-shaped spring retainer are rigidly secured as by spot welding to the skirts of the frame therewithin. Small cutouts 52*a* shown in FIG. 11 at each side of the upper portion of each spring retainer provide clearance for the rounded interior corners of the frame whereas the center part of each spring retainer abuts the inner wall of the upper flat portion of the frame. Each spring retainer further has a rectangular slot 52*b* extending partway up from its center portion for retaining one end of the stack of springs as shown in FIGS. 10 and 11. The part of the spring retainer at the upper end of this slot bears against the springs to apply force to the springs when the clamping bolt nuts are tightened.

Figure 13:
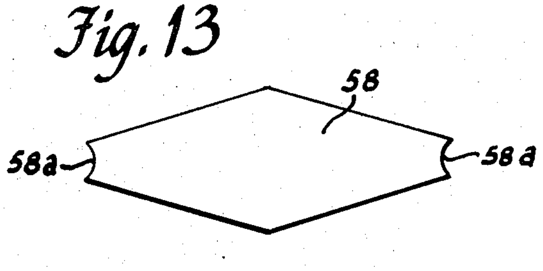
FIG. 13 is a top view of one of the compression force springs used in the modified subassembly of FIGS. 10–12.

As shown in FIG. 13, the flat springs 58 are diamond shaped, being wide at the center and tapering down at the ends in like manner. The opposite ends 58*a* of the springs are preferably concave of a radius to fit the clamping bolts and to be confined therebetween. Thus, the springs are guided by the clamping bolts and the spring retainers.

Bottom plate 62 comprises a flat strip or rectangular plate of metal coextensive with the bottom of the frame. This plate is provided with a hole at its center for holding and centering pressure bearing 60. A hole is provided near each end for the clamping bolts that extend therethrough. Further small holes may be provided at opposite ends of this bottom plate whereby it may be secured to the spring retainers by screws, rivets, or the like.

Pressure bearing 60 is generally similar to the pressure bearing in FIG. 2 in that it is generally cylindrical in shape with its upper end formed as a partial sphere for pivotal engagement with the lowermost spring in the stack. Directly below this upper end there is an annular flange slightly larger in diameter than the hole in the bottom plate whereby the pressure bearing is supported in the bottom plate with the remainder of the pressure bearing hanging down through this hole to bear against the upper heat sink.

Force indicator 56 comprises a shouldered cylindrical plunger 56*a* mounted in an upstanding bushing 56*b* that is secured in a hole at the center of the upper flat portion of the frame. The lower portion of this plunger is largest in diameter to provide a shoulder between it and the reduced diameter upper end portion. A helical bias spring rests on this shoulder and surrounds the reduced upper end portion of the plunger. The upper end of this bias spring bears against a shoulder provided by a constriction at the upper end of the bushing. The reduced upper end of the plunger is free to move up through the hole in the upper end of the bushing against the force of the bias spring. The upper end of this plunger is provided with an annular groove providing a force indicator relative to the upper end of the bushing.

Between this plunger and the upper spring in the stack there is provided a lever system constituting a mechanical motion amplifier that is adjustable. This lever system comprises two levers. Of these, a first lever 56c is pivotally mounted to the frame and bears against the top spring in the stack. A second lever 56d is pivotally mounted to the first lever and bears against the lower end of the plunger.

The pivotal mounting for the first lever comprises a T-shaped member 56e riveted in a slit in the upper portion of the frame. It extends through a hole in the first lever with its T-bar below this first lever to form a support on which the first lever can pivot. A helical compression spring 56f surrounds pivot member 56e and is confined between the frame and first lever to bias the latter down against the T-bar.

The first lever has a straight portion extending to the right from its left end at which it is pivotally supported, as just described, at a point spaced from its left end. To the right of this pivot point the first lever is bent down and then up to provide a reentrant bend having an apex bearing down on the center of the top spring. The right end of this first lever has a reduced vertical portion extending into a slit in the intermediate portion of the second lever to form a pivotal support for the second lever. An adjusting screw 56g is threaded down through a hole in the frame to bear against the extreme left end of first lever 56c. Another adjusting screw 56h is threaded down through a hole in the top of the frame to bear against the right end portion of second lever 56d. The left end portion of the second lever bears against an apex at the lower end of indicator plunger 56a.

From the foregoing description of the lever system, it will be apparent that screw 56g may be turned to adjust the indicator plunger to its lowest level of travel. Screw 56h may be turned to calibrate the indicator under load.

When the clamping bolt nuts are turned to increase the force on the SCR, springs 58 bow upwardly at their center whereby the vertical distance between the springs and the top of the frame decreases. As a result, the top spring pushes up on the apex of first lever 56c to pivot the latter counter clockwise. This causes the pivot point of second lever 56d to be raised thereby pivoting the second lever clockwise on screw 56h. As a result, the left end of the second lever rises to lift plunger 56a up. With proper calibration, the position of the groove on this plunger above the level of the frame will indicate when the required compression force is reached on the SCR.

Referring now to both versions of the SCR clamp, it will be seen that the clamp structure disclosed provides centralization of the pressures on the SCR. Use of a round pivot bar 8 affords limited rocking movement for the lower heat sink in the forward-rearward vertical plane. The elongated pivot between section 8g of the pivot bar and the pressure plate affords self-alignment and central loading by the bar. Use of the pressure plate over the pivot bar affords an enlarged base to provide low unit pressure on the insulation between the pressure plate and the lower heat sink. The insulating enclosure 20 provides centering means for the pressure plate and the tight cover at the bottom excludes dust and prevents parts from falling out of place.

The boot for the SCR is a boot of heat resistant synthetic rubber having inside and outside ribs to increase electrical clearances and creepage distances. This boot tightly encloses the portions of the SCR subjected to high voltage and tightly contacts other parts to exclude dust and dirt. This boot is provided with a notch for the cathode lead and a hole for the gate lead to position the same. It will be apparent that although the upper heat sink forms a conductive path for conducting the power current in response to the high voltage, a separate cathode lead may be used for control purposes to avoid any voltage drop in the SCR to heat sink junction.

Pressure pivot 34 in FIG. 2 (or pressure pivot 60 in FIG. 10) allows rocking in any direction. This pressure pivot on top and the round pivot bar below the heat sinks insures self-alignment so that the heat sinks will lie flat against the anode and cathode electrode faces and the force will be centered to prevent overloading of any part of the internal SCR semiconductor disc. Force contact is made evenly over the electrode faces to afford uniform heat conductivity and good electrical conductivity.

The diamond shaped, tapered springs distribute the stress equally throughout their lengths which affords greater deflection whereby to reduce the effect of tolerances and enable it to stay within the allowable pressure range better. The unit spring structure can be assembled as a subassembly to provide a supporting enclosure for the springs and to hold the pressure bearing and the force indicator. The spring clip 32 shown in FIG. 2 takes up tolerances so that it doesn't rattle, holds the springs together so that they don't slip during assembly, acts as a buffer between the pressure bearing and the leaf springs, and eliminates the requirement for use of shims.

While the apparatus hereinbefore described is effectively adapted to fulfill the objects stated, it is to be understood that the invention is not intended to be confined to the particular preferred embodiment of compression mounted SCR clamp disclosed, inasmuch as it is susceptible of various modifications without departing from the scope of the appended claims.

I claim:

1. A mounting and connecting clamp for a compression mounted semiconductor device comprising:
   - a clamping assembly including a cross bar and a pair of clamping bolts with the threaded ends of said bolts extending up from the opposite ends of the cross bar;
   - insulating means covering said cross bar and continuing along a portion of each of said bolts;
   - a pair of back to back heat sinks held on said bolts above said cross bar and a semiconductor device therebetween;
   - a compression springs subassembly coupling the threaded ends of said bolts, and nuts threaded to be tightened on the latter to apply compressive force between the power terminal faces of the semiconductor device and said heat sinks, said compression springs subassembly comprising:
   - said guide members being alike and each having a first configuration on one side directed inwardly on a first group thereof and guiding the associated ends of said springs and a second configuration on the other side directed inwardly on a second group thereof and overlying said ends of said springs to press down thereon when said nuts are tightened;

and means rigidly securing the spring guide members of each stack together so that the lower guide members in the stack forming said first group have said first configuration directed toward said springs and the upper guide members in the stack forming said second group have said second configuration directed toward said springs.

2. The invention defined in claim 1, wherein said spring guiding and force applying means comprises:

a stack of spring guide members at each end of said springs;

a pressure bearing and means holding it centered against the upper heat sink;

a plurality of diamond shaped compression force springs stacked on said pressure bearing, each said spring being imperforate throughout its effective length;

spring guide and force applying means holding said springs in stacked relation and applying downward force on the ends of said springs as a result of said nuts having been tightened thereby causing said springs to apply force through said pressure bearing to said heat sinks and the semiconductor device therebetween;

and force indicator means mounted on said spring guide and force applying means indicating when the proper force is reached as said nuts are tightened.

3. The invention defined in claim 2, wherein said spring guiding and force applying means also comprises:

a top plate bridging the tops of the two stack of said guide members and rigidly secured thereto;

and a hole in said top plate through which said force indicator means projects when said nuts are tightened.

4. The invention defined in claim 3, wherein said force indicator means comprises:

a metal strip coextensive with said compression force springs positioned on top of the latter and having its ends bearing on said upper guide members in the two stacks thereof;

a tongue formed in said strip having a free end movable upwardly when said strip bows with said compression force springs;

and a tab on the end of said tongue extending through said hole in said top plate and indicating relative to said top plate when the proper force is reached.

5. The invention defined in claim 1, wherein said cross bar comprises:

a round pivot bar having holes through its ends through which said clamp bolts extend and undercut end portions for locating the heads of said bolts and to keep them from turning;

and a flat pressure plate between the center of said pivot bar and the lower heat sink to afford low unit pressure on the insulation therebetween.

6. The invention defined in claim 1, wherein said insulating means comprises:

a rubber boot surrounding the semiconductor device and sealing the space around the latter between said heat sinks.

7. The invention defined in claim 1, wherein said plurality of diamond shaped compression force springs comprise:

one spring for each unit of force required to be applied between said heat sinks and the semiconductor device so that the desired multiple of unit force can be attained by selecting the corresponding number of compression force springs;

and each said spring being flat and tapering from a relatively wide center toward the opposite ends so as to distribute the stresses equally throughout its length.

8. The invention defined in claim 2, wherein said means holding said pressure bearing centered against the upper heat sink comprises:

a bottom plate rigidly secured in a bridging relation to the bottoms of the two stacks of guide members;

and a hole at the center of said bottom plate retaining said pressure bearing centered on the upper heat sink.

9. The invention defined in claim 1, wherein said force indicator means comprises:

a spring biased plunger indicating the amount of force by its position;

and a mechanical motion amplifying lever system between the upper compression force spring and said plunger;

and adjustable means for presetting the initial position of said plunger with respect to a reference level and for calibrating the final position of said plunger under load.

10. The invention defined in claim 1, wherein said spring guiding and force applying means comprises:

a spring clip having upstanding arms between which said compression force springs are stacked and held together;

and the bottom of said spring clip being offset from the lowermost compression force spring to rest on said pressure bearing to take up slack in said subassembly.

11. The invention defined in claim 1, wherein said insulating means comprises insulating members covering said cross bar and portions of said bolts.

* * * * *

PO-1050
(5/69)

UNITED STATES PATENT OFFICE
CERTIFICATE OF CORRECTION

Patent No. 3,688,159 Dated August 29, 1972

Inventor(s) Clyde F. Robbins

It is certified that error appears in the above-identified patent and that said Letters Patent are hereby corrected as shown below:

Column 1, line 35, "simiconductor" should be --semiconductor--.
Column 3, line 57, "correction" should read --connection--.
Column 5, line 52, reads "rear edge to point" and should read --rear edge to a point--.

Claims 1 and 2 should read as follows:

--1. A mounting and connecting clamp for a compression mounted semiconductor device comprising:

a clamping assembly including a cross bar and a pair of clamping bolts with the threaded ends of said bolts extending up from the opposite ends of the cross bar;

insulating means covering said cross bar and continuing along a portion of each of said bolts;

a pair of back to back heat sinks held on said bolts above said cross bar and a semiconductor device therebetween;

a compression springs subassembly coupling the threaded ends of said bolts, and nuts threaded to be tightened on the latter to apply compressive force between the power terminal faces of the semiconductor device and said heat sinks, said compression springs subassembly comprising:

a pressure bearing and means holding it centered against the upper heat sink;

a plurality of diamond shaped compression force springs stacked on said pressure bearing, each said spring being imperforate throughout its effective length;

spring guide and force applying means holding said springs in stacked relation and applying downward force on the ends of said springs as a result of said nuts having been tightened thereby causing said springs to apply force through said pressure bearing to said heat sinks and the semiconductor device therebetween;

PO-1050
(5/69)

UNITED STATES PATENT OFFICE
CERTIFICATE OF CORRECTION

Patent No. 3,688,159 Dated August 29, 1972

Inventor(s) Clyde F. Robbins

It is certified that error appears in the above-identified patent and that said Letters Patent are hereby corrected as shown below:

(Claim 1 continued)

and force indicator means mounted on said spring guide and force applying means indicating when the proper force is reached as said nuts are tightened.

--2. The invention defined in claim 1, wherein said spring guiding and force applying means comprises:

a stack of spring guide members at each end of said springs;

said guide members being alike and each having a first configuration on one side directed inwardly on a first group thereof and guiding the associated ends of said springs and a second configuration on the other side directed inwardly on a second group thereof and overlying said ends of said springs to press down thereon when said nuts are tightened;

and means rigidly securing the spring guide members of each stack together so that the lower guide members in the stack forming said first group have said first configuration directed toward said springs and the upper guide members in the stack forming said second group have said second configuration directed toward said springs.

Signed and sealed this 30th day of January 1973.

(SEAL)
Attest:

EDWARD M.FLETCHER,JR.
Attesting Officer

ROBERT GOTTSCHALK
Commissioner of Patents